Feb. 8, 1955  S. A. HIRTLE  2,701,819
ELECTRIC CORD
Filed Feb. 16, 1954
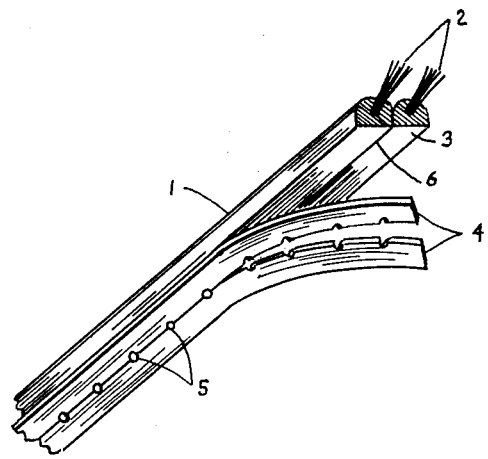
INVENTOR.
STANLEY A. HIRTLE

United States Patent Office 2,701,819
Patented Feb. 8, 1955

2,701,819

ELECTRIC CORD

Stanley A. Hirtle, San Francisco, Calif.

Application February 16, 1954, Serial No. 410,615

1 Claim. (Cl. 174—117)

This invention relates to improvements in electric cords and more particularly to the provision of an electric cord provided with means to facilitate the convenient attaching of a cord to a wall or other desired places.

Electric cords for radios, and other electrical appliances are frequently used in different rooms in a house and generally require extension electric cords and means for holding the cord in an out of the way position relative to the appliance. Heretofore, such cords have been mounted on a wall or other places by means of hooks, nails, and other expedients which are usually unsightly and inconvenient.

It is, therefore, an object of this invention to provide an electrical cord having one surface thereof coated with an adhesive to enable it to be easily attached to a wall or the like.

A further object is the provision of an electric cord having an adhesive to enable the cord to be attached to a wall, and a protective strip of tape to cover the adhesive when the cord is not being used.

These and other objects are attained by the novel construction and arrangement of parts hereinafter described and illustrated by the accompanying drawings, forming a part hereof, and in which the figure is a perspective view of an electric cord embodying the invention.

Referring to the drawings, in the figure is shown a pair of electrical conducting wires 2 each of which is embedded in a body 1 of semicircular cross section and having a flat bottom portion or under surface coated with an adhesive 3. The bodies 1 are made of an insulating material and are connected by the thin strip of insulating material 6 which can be easily torn so that the conductors can be used singly or as a pair.

When not in use the adhesive surface 3 is covered by a protective strip of tape 4 which has a longitudinal central scored line and a plurality of holes 5 along the scored lines so that the protective strip can be easily torn into two sections, one for each body 1 when it is desired to use the conductors singly.

In operation, when it is desired to use the conductors in various places, the protective strip 4 is removed exposing the adhesive surface 3 to enable the conductors to be easily and conveniently attached to any desired surface such as a wall, pipe, floor, ceiling, etc.

From the above description it will be seen that there has been provided a simple device which enables the electrical conductors to be mounted in various positions about a room without necessitating the use of nails, hooks, and the like, and thus avoid considerable inconvenience.

The above description is to be considered as illustrative and not limitative of the invention of which modification can be made without departing from the spirit and scope of the appended claim.

The invention having been described, what is claimed is:

In an electric cord, a pair of metallic conductors, a pair of bodies of insulating material surrounding said conductors, each of said bodies being semicircular in cross section and having a flat undersurface, a thin strip of insulating material connecting the undersurfaces of the bodies, said thin strip of insulating material being easily severed so that the conductors can be used singly or as a pair, a coating of adhesive on said undersurfaces, and a protective strip of tape covering said adhesive coating, said strip having a longitudinal scored center line provided with a plurality of spaced holes to enable the strip to be easily torn to provide two separate strips when the cords are to be used singly.

References Cited in the file of this patent

UNITED STATES PATENTS

| 303,735 | Jackson | Aug. 19, 1884 |
| 1,984,356 | Abbott | Dec. 18, 1934 |
| 2,066,242 | Abbott | Dec. 29, 1936 |
| 2,155,060 | Phillips | Apr. 18, 1939 |

FOREIGN PATENTS

| 215,873 | Great Britain | May 22, 1924 |